United States Patent
Kozak et al.

(10) Patent No.: US 9,557,483 B2
(45) Date of Patent: Jan. 31, 2017

(54) FIBER COUPLER

(71) Applicant: TRUMPF Laser GmbH, Schramberg (DE)

(72) Inventors: Marcin Kozak, Teltow (DE); Malte Kumkar, Weimar (DE); Peter Riedel, Jena (DE); Hagen Zimer, Dunningen-Seedorf (DE)

(73) Assignee: TRUMPF Laser GmbH, Schramberg (DE)

( * ) Notice: Subject to any disclaimer, the term of this patent is extended or adjusted under 35 U.S.C. 154(b) by 0 days.

(21) Appl. No.: 14/406,224

(22) PCT Filed: Jun. 3, 2013

(86) PCT No.: PCT/EP2013/061410
§ 371 (c)(1),
(2) Date: Dec. 7, 2014

(87) PCT Pub. No.: WO2013/182529
PCT Pub. Date: Dec. 12, 2013

(65) Prior Publication Data
US 2015/0139587 A1 May 21, 2015

(30) Foreign Application Priority Data

Jun. 8, 2012 (DE) .................. 10 2012 209 630

(51) Int. Cl.
*G02B 6/26* (2006.01)
*G02B 6/04* (2006.01)
(Continued)

(52) U.S. Cl.
CPC . *G02B 6/26* (2013.01); *G02B 6/04* (2013.01); *G02B 6/2551* (2013.01); *G02B 6/368* (2013.01); *G02B 6/3664* (2013.01)

(58) Field of Classification Search
CPC ...................................... G02B 6/368
See application file for complete search history.

(56) References Cited

U.S. PATENT DOCUMENTS 3,912,362 A 10/1975 Hudson
4,564,417 A 1/1986 Schoen et al.
(Continued)

FOREIGN PATENT DOCUMENTS

CA  WO 2007045082 A1 * 4/2007 ........... G02B 6/2551
WO  2007015577 A1  2/2007

OTHER PUBLICATIONS

International Preliminary Report on Patentability for PCT/EP2013/061410, dated Dec. 9, 2014, 12 pages.

*Primary Examiner* — Rhonda Peace
(74) *Attorney, Agent, or Firm* — Skaar Ulbrich Macari, P.A.

(57) ABSTRACT

A fiber coupler is provided, which includes a tubular enveloping structure and several optical fibers arranged in the enveloping structure, each of which has a fiber core and a fiber cladding surrounding same, in order to conduct laser radiation, and each of which extends from the first as far as the second end of the enveloping structure. The enveloping structure includes a tapering section which is tapered in a first direction from the first as far as the second end. In the tapering section, both a first ratio of the diameter of the fiber core to the diameter of the fiber cladding and also a second ratio of the diameter of the mode field of the laser radiation conducted in the optical fiber to the diameter of the fiber core, increases in the first direction for each optical fiber.

19 Claims, 4 Drawing Sheets

(51) Int. Cl.
*G02B 6/255* (2006.01)
*G02B 6/36* (2006.01)
*G02B 6/42* (2006.01)

(56) References Cited

U.S. PATENT DOCUMENTS

| | | | | |
|---|---|---|---|---|
| 5,129,021 A * | 7/1992 | Mortimore | ........... | G02B 6/2856 385/43 |
| 5,295,210 A * | 3/1994 | Nolan | ................. | G02B 6/2856 385/43 |
| 6,078,716 A | 6/2000 | Huang et al. | | |
| 6,823,117 B2 * | 11/2004 | Vakili | ...................... | G02B 6/14 385/43 |
| 6,990,278 B2 * | 1/2006 | Vakili | ...................... | G02B 6/14 385/115 |
| 7,209,615 B2 * | 4/2007 | Fishteyn | ................. | C03C 25/68 385/115 |
| 7,460,755 B2 * | 12/2008 | Bruesselbach | ........... | G02B 6/04 385/115 |
| 7,532,792 B2 * | 5/2009 | Skovgaard | ......... | G02B 6/02376 385/24 |
| 7,720,340 B2 * | 5/2010 | Lewis | ................. | G02B 6/2804 156/166 |
| 7,813,603 B2 * | 10/2010 | Nikolajsen | ........... | G02B 6/2817 359/334 |
| 7,839,902 B2 * | 11/2010 | Li | ........................ | G02B 6/2835 372/6 |
| 7,840,107 B2 * | 11/2010 | Tanigawa | ........... | G02B 6/02042 359/341.32 |
| 8,040,926 B2 * | 10/2011 | Tanigawa | ........... | G02B 6/02042 372/6 |
| 8,351,114 B2 * | 1/2013 | Nelson | ................. | G02B 6/2835 359/341.5 |
| 8,693,088 B2 * | 4/2014 | Fini | ...................... | G02B 6/2835 359/334 |
| 8,712,199 B2 * | 4/2014 | Kopp | ...................... | G02B 6/30 385/115 |
| 8,787,716 B2 * | 7/2014 | Kumkar | ............... | G02B 6/2856 385/15 |
| 2006/0257083 A1 | 11/2006 | Rasmussen | | |
| 2008/0267560 A1 * | 10/2008 | DiGiovanni | ............. | G02B 6/14 385/28 |
| 2009/0154881 A1 | 6/2009 | Salokatve | | |
| 2010/0061410 A1 | 3/2010 | Platonov et al. | | |
| 2010/0189138 A1 | 7/2010 | Shkurikhin et al. | | |
| 2010/0195195 A1 | 8/2010 | Nelson et al. | | |
| 2010/0278486 A1 | 11/2010 | Holland et al. | | |
| 2011/0002585 A1 | 1/2011 | Gibson et al. | | |
| 2011/0123155 A1 | 5/2011 | Kumkar | ............... | G02B 6/2856 385/43 |
| 2011/0280517 A1 * | 11/2011 | Fini | ................... | G02B 6/02042 385/43 |
| 2012/0281948 A1 | 11/2012 | Shamir et al. | | |

* cited by examiner

FIBER COUPLER

PRIORITY

This application claims the benefit of German Patent Application No. 102012209630.2, filed on Jun. 8, 2012, which is hereby incorporated herein by reference in its entirety.

FIELD

The present invention relates to a fibre coupler with a tubular enveloping structure and several optical fibres arranged in the enveloping structure, each of which has a fibre core and a fibre cladding surrounding same, in order to conduct laser radiation, and each of which extends from the first as far as the second end of the enveloping structure, wherein the enveloping structure has a tapering section which is tapered in a first direction from the first as far as the second end.

BACKGROUND

Such fibre couplers for geometric coupling of laser radiation conducted in the optical fibres are formed for example by drawing and merging the optical fibres. To achieve a high brilliance in the output beam bundle exiting the fibre coupler, the ratio of core diameter to overall diameter of the optical fibres can be increased up to the output side in the coupler, as described e.g. in EP 2 071 376 A1. Alternatively, the ratio of the mode field diameter of the laser radiation conducted in the optical fibres to the core diameter in the coupler can be increased (US 2010/0278486 A1, US 2010/0189138 A1) wherein, during a tapering by drawing the optical fibres by more than the factor of three, complex refractive index structures are required to achieve a high brilliance.

SUMMARY

Starting from this, the object of the invention is to provide a fibre coupler which transfers the laser radiation conducted in the optical fibres in an output beam bundle, wherein the brilliance of the output beams, which exit from the individual optical fibres and which form the output beam bundle, is maintained to the greatest possible extent.

The object is achieved by a fibre coupler with a tubular enveloping structure and several optical fibres arranged in the enveloping structure, each of which has a fibre core and a fibre cladding surrounding same, in order to conduct laser radiation, and each of which extends from the first as far as the second end of the enveloping structure, wherein the enveloping structure has a tapering section which is tapered in a first direction from the first to the second end, wherein, in the tapering section, both a first ratio of the diameter of the fibre core to the diameter of the fibre cladding and also a second ratio of the diameter of the mode field of the laser radiation conducted in the optical fibre to the diameter of the fibre cladding increases in the first direction for each optical fibre.

With such a fibre coupler, the desired geometric coupling of the laser radiation (output beams) exiting the optical fibres can be achieved with the best possible brilliance of the combined output beam bundle formed by the exiting laser radiation. Additionally, the brilliance of the output beams exiting from the individual optical fibres is impaired only insubstantially (the laser beams have not experienced any, or only a small, coupling among themselves), with the result that the output beams of the output beam bundle can be addressed or used individually if desired. By an only insubstantial impairment is meant in particular here that the brilliance is at least 90% or preferably at least 95% of the original brilliance. The output beam bundle has a higher occupancy of the phase space and, on the basis of the individually addressable output beams, enables a targeted chronological and spatial beam formation, as location and beam parameters of each laser beam exiting an optical fibre are clearly defined.

In the fibre coupler according to the invention, the input beam conducted in each individual optical fibre is transferred in individually exiting output beams, wherein the brilliance of the individually exiting output beams largely corresponds to the individually conducted input beams. The fibre coupler according to the invention makes possible a targeted arrangement of the individually exiting output beams, wherein this arrangement in particular also permits the individual addressing of the individual output beams, and makes it possible for the output beam bundle to be able to formed from several individually exiting parts (the output beams exiting the optical fibres) with an overall high brilliance.

Thus, e.g. with the fibre coupler according to the invention, an input radiation in the form of fundamental mode radiation conducted in two individual fibres can be transferred in a bundle of two output beams with largely parallel beam axes, which bundle has at the second end of the enveloping structure a beam waist of the fundamental mode of the individually exiting output beams, wherein the distance between the axes is smaller than the fundamental mode diameter and the power in this fundamental mode corresponds to at least 90% of the coupled fundamental mode power.

The optical fibres of the fibre coupler according to the invention are preferably fibres which are suitable also for transporting laser radiation over greater distances. The enveloping structure can have the structure of an internal tube and a surrounding enveloping tube or can be made of same. In particular, the fibre coupler can be formed as a monolith.

With the fibre coupler according to the invention the optical fibres are preferably fundamental mode or low mode optical fibres, corresponding to a V parameter of between 2.4 and 4.5. For step index fibres, the V parameter is produced from the core diameter $d_1$, the wavelength $\lambda$ and the numerical aperture ($NA=\sqrt{n_1^2-n_2^2}$) wherein $n_1$ and $n_2$ stand for the refractive index of the core or of the cladding:

$$V = \frac{\pi d_1 NA}{\lambda}$$

Thus the optical fibres of the fibre coupler have, on the input side (thus before the tapering section), preferably a V parameter of between 2.4 and 4.5, in particular of between 2.8 and 4.5. On the basis of the tapering section, the V parameter of the optical fibres of the fibre coupler has, on its output side, preferably a value from the range of 1.8 to 2.0.

For fibres with a more complex refractive index profile, an equivalent V parameter can be used accordingly.

At a wavelength of 1.0-1.1 μm, preferably fibres are used which, before the enlargement of the ratio of the core diameter to the cladding diameter and/or of mode field diameter to core diameter, have a core diameter of between 10 and 25 µm and a cladding diameter of between 125 and 250 µm with mode fields of between 8 and 25 µm. Furthermore, the fibre claddings of the optical fibres preferably have an homogeneous refractive index profile.

The optical fibres are fused with one another at the second end directly and/or via the enveloping structure. The optical fibres are also fused at least in the tapering section directly and/or via the enveloping structure.

The optical fibres are not fused with one another outside of the enveloping structure before the first end.

As the optical fibres at the first end are conducted out of the fibre coupler individually as far as the fused second end and without free beam interface, the fibre coupler according to the invention can be called a monolithic fibre coupler.

Preferably, the transition from non-fused to completely fused region takes place at a point in the fibre coupler at which the enlargement of the core diameter relative to the cladding diameter and enlargement of the mode field diameter relative to the core diameter of the optical fibres remains still under a factor of 1.2 in respect of the untapered diameter, with the result that the fibres still retain 80% or more of their original overall diameter (diameter of the quartz cladding). Thus it is achieved, advantageously, that forces occurring upon fusing cause only such deformations in the fibre cladding and in the fibre core which have only an insubstantial effect on the conducting properties of the optical fibres.

With the fibre coupler according to the invention, the thickness of the fibre cladding in the first direction can decrease in order to have the increase of the first ratio. This can be produced easily, e.g. by "removing" the fibre claddings of the optical fibres, e.g. with the help of an etching process. Alternatively, the refractive index profile of the fibre claddings can be changed, with the result that a part of the fibre cladding functions as a core. This can be achieved e.g. via thermally induced diffusion processes.

Furthermore, with the fibre coupler according to the invention, the maximum value of the second ratio can be chosen such that, in spite of an overlapping of the (conducted) modes in adjacent optical fibres, beams are still individually conducted in each optical fibre. For this it is ensured e.g. that there is an homogeneous refractive index beyond the optical fibres. This is achieved by the choice of geometry and material of the fibre cladding and the enveloping structure or other materials occupying the spaces between the fibres, with the result that there is a ring (seen in cross-section) with nearly homogeneous refractive index around each core of the optical fibres used for light conduction.

With the fibre coupler according to the invention, the diameter of the fibre core can decrease in the first direction in order to have the increase of the second ratio. This can be achieved easily by drawing the fibre coupler. In order to guarantee the safety of the process and prevent disruptions, only the fused region should be drawn. By drawing the optical fibres, the core becomes smaller and the mode field also continues to extend in the outer region, wherein the parameters are to be chosen such that the mode field does not extend significantly in the next core. The geometric space for superimposing the individual laser irradiations from the individual optical fibres is thus used optimally, and it is simultaneously ensured that the output beams exiting the individual optical fibres can still be addressed individually.

With the fibre coupler according to the invention, the enveloping structure can have the structure of an internal tube (which e.g. is formed as a multicapillary), which internal tube comprises precisely one through bore for each optical fibre. With such the structure of an internal tube the fibre coupler can be produced easily with the desired precision.

Furthermore, a method for producing a fibre coupler is provided in which several optical fibres are provided, each of which has a fibre core and a fibre cladding surrounding same in order to conduct laser radiation, with a cladding thickness decreasing in longitudinal direction of the optical fibres, the several optical fibres are inserted in a tubular raw enveloping structure such that they lie adjacent to one another, the optical fibres are fused with one another directly and/or via the raw enveloping structure and the raw enveloping structure is tapered in a tapering section with the inserted optical fibres in a first direction with the result that, in the tapering section, both a first ratio of the diameter of the fibre core to the diameter of the fibre cladding and also a second ratio of the diameter of the mode field of the laser radiation to be conducted in the optical fibre to the diameter of the fibre core increases in the first direction for each optical fibre.

With this method a fibre coupler according to the invention can be produced with high precision in reproducible manner.

With the method according to the invention, the raw enveloping structure can have the structure of an internal tube (e.g. a multicapillary) with bores for each optical fibre, wherein precisely one optical fibre can be inserted in each bore.

Alternatively, with the method according to the invention, the raw enveloping structure can have a tube with a bore in which the optical fibres are inserted and then lie directly adjacent to one another.

In particular, the bore(s) can be designed tapered before the optical fibres are inserted.

Furthermore, when fusing the optical fibres, they can be loaded with tensile stress. Furthermore, the tubular raw enveloping structure can also be loaded with tensile stress. Additionally, the bore(s) can also be loaded with negative pressure. These measures help prevent undesired bending of the optical fibres.

The production method according to the invention can also still contain the production steps described in conjunction with the fibre coupler according to the invention.

It is understood that the features mentioned above and those yet to be explained in the following are applicable, not only in the given combinations, but also in other combinations or singly, without departure from the scope of the present invention.

BRIEF DESCRIPTION OF THE DRAWINGS

The invention is explained by way of example in yet greater detail in the following with reference to the attached drawings, which also disclose features essential to the invention. There are shown in.

DETAILED DESCRIPTION

Figure 1:
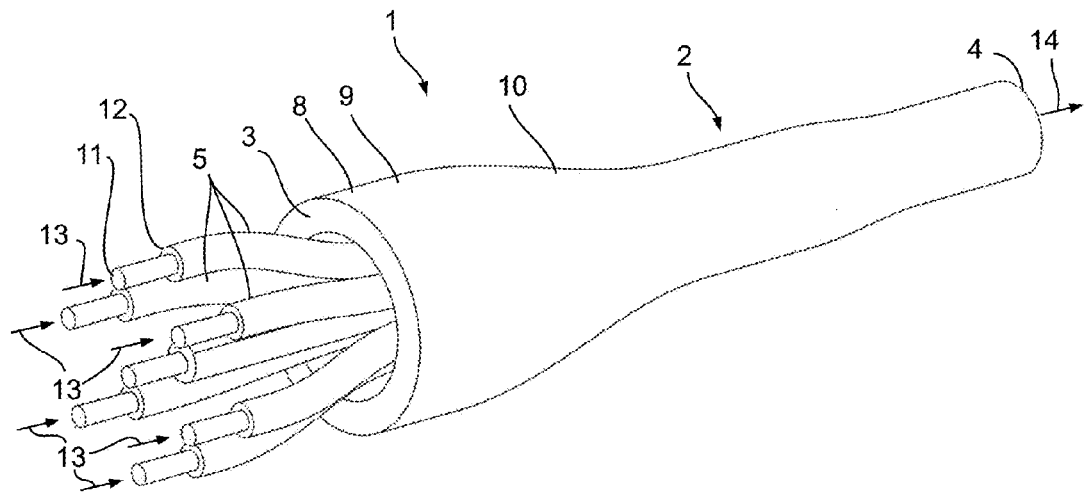
FIG. 1 a perspective view of the fibre coupler according to the invention.
Figure 2:
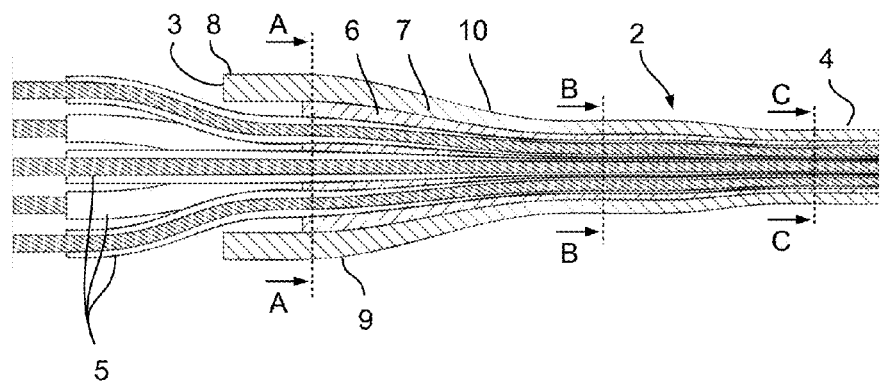
FIG. 2 a longitudinal section of the fibre coupler according to FIG. 1.
Figure 3A:
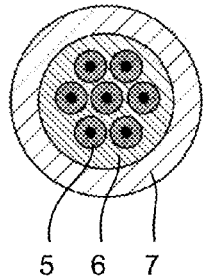
FIG. 3A a sectional view along section A-A from FIG. 2.
Figures 3B, 3C:
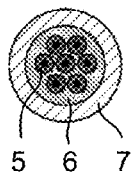
FIG. 3B a sectional view along section B-B from FIG. 2.
FIG. 3C a sectional view along section C-C from FIG. 2.

In the embodiment shown in FIGS. 1-3C the fibre coupler 1 according to the invention comprises a tubular enveloping structure 2 with two opposing ends 3, 4 as well as several (here seven) optical fibres 5, each of which has a core and a cladding arranged around same, which are typically made of quartz glass and which fibres are arranged adjacent to one another, and extend from the first to the second end 3, 4, wherein they pass via the first end 3 into the enveloping structure 2, as shown in particular in FIGS. 1 and 2. For better comprehension, the projection of the fibres is reduced and the cladding has been removed in the front part, as well as the core, is also shown enlarged in FIGS. 3 and 4.

The tubular enveloping structure 2 comprises an internal tube structure formed as a multicapillary 6, which has a bore for each optical fibre 5, in which bore the corresponding optical fibre 5 is embedded, as well as an enveloping tube 7 surrounding the multicapillary 6. The enveloping tube 7 projects slightly beyond the multicapillary 6 at the first end 3. This projecting section of the enveloping tube 7 forms an entry region 8 which surrounds the optical fibres 5 merely as a bundle and not individually, and in which region the optical fibres 5 are not merged with the internal tube structure 6.

A tapering region 10 follows the entry region 8, wherein a transition 9 between the two regions 8 and 10 is characterised in that, in this region, the connection state of the optical fibres 5 to the internal tube structure 6 changes from completely unfused to completely fused. The axial length of the transition is usually smaller than or the same as the diameter of one of the optical fibres 5. The essential tapering, but not inevitable any tapering, of the optical fibres takes place in this tapering region.

The tapering region 10 extends following to the transition 9 in the first direction as far as the second end 4 and here, the outer diameter of the optical fibres tapers in this first direction.

The optical fibres 5 can of course already also be tapered in the transition 9. For the transition 9 it is essential that the change from unfused to completely fused takes place here.

The optical fibres 5 each have a fibre core 11 with a preferably rotation-symmetrical refractive index profile, and a fibre cladding 12, surrounding same, with an homogeneous refractive index. The refractive index profile and the geometry of the optical fibres 5 are chosen such that, in the section not projecting in the coupler 1 (thus the part to the left of the coupler in FIG. 2) and within the entry region 8, they secure a conduction of laser radiation in the fibre core 11, preferably as fundamental mode radiation, but at most as low mode radiation.

Furthermore, the length of the optical fibres 5 to the left of the first end 3 can be smaller or in particular larger than shown.

As can be seen in particular from the representations in FIGS. 2 and 3A-3C, in the tapering region (in particular between the sections A-A and B-B in FIG. 2) each optical fibre 5 experiences an increase in a first ratio of the core diameter to the overall diameter. Moreover, each optical fibre 5 experiences an increase in a second ratio of mode field diameter of the laser radiation conducted in the optical fibre 5 to the core diameter. This increase in the second ratio occurs preferably close to the second end 4, in particular from the section B-B or from the section C-C according to FIG. 2.

By means of this design of the fibre coupler 1 it is achieved that the laser radiation conducted in the optical fibres 5 as input beams 13 (indicated by arrows in FIGS. 1 and 2) are conducted in the optical fibres 5 as far as the second end 4 and are in each case emitted as output beams and thus as a part of the output beam bundle 14, wherein each optical fibre 5 conducts the input beam 13 such that its brilliance in the output beam remains as high as possible. However, as the output beams of the individual optical fibres 5 are spatially packed clearly more densely, the common output beam bundle 14 formed by the individual output beams can be provided, the brilliance of which bundle is clearly better than that of all the input beams 13 at the first end 3 of the fibre coupler 1. Furthermore, the individual output beams of the output beam bundle 14 are present still as separate fundamental mode beams or low mode beams which can be advantageous for further use or employment of the output beams, in particular in the field of materials processing with laser radiation, such as e.g. cutting or welding of metallic workpieces.

With the fibre coupler according to the invention 1, the optical fibres 5 are fused, partly or completely, with the multicapillary 6, over the whole tapering region 10 or at least over broadly the whole tapering range 10.

As shown in FIG. 2, the outer diameter of the optical fibre 5 can be tapered already at the transition 9 and thus the entry into the multicapillary 6. This increases the safety of the process as the capillary diameter and the fibre diameter can be matched such that an extensive positive lock is produced and the fibre cannot move, deform or buckle upon merging. This leads furthermore to the advantage that disruptions due to surface tensions, which can occur in the production process during merging, can be very well avoided. Typically, the optical fibres 5 are not yet significantly tapered at the transition 9. A maximum tapering to not less than 80% of the original overall diameter of the respective optical fibre 5 is typical here. Moreover, the individual optical fibres are completely fused with the multicapillary in axial direction at a length clearly below the radius of a fibre.

The enveloping structure 2, and thus the multicapillary 6, surrounds the individual optical fibres 5 in the fused region such that the round cross-section of the fibre cores 11 remains intact and there is also no bending of the optical fibres 5 which significantly influences beam conduction. Furthermore, the fibre coupler 1 in the fused region is produced such that, due to corresponding selection of the material of the enveloping structure 2 and in particular of the multicapillary 6 for each individual optical fibre 5 around each core there is a region, the refractive index of which corresponds to the refractive index of the fibre cladding, the extension of which in radial direction corresponds at least to the core radius of the optical fibre 5. Additionally, this region is preferably highly transmissive and low scattering for the conducted radiation.

The fibre coupler 1 can for example be produced by using individual optical fibres 5 which have been tapered in advance by eroding the fibre cladding 12, which optical fibres 5 can be used in a pre-made raw enveloping structure.

Figure 4:
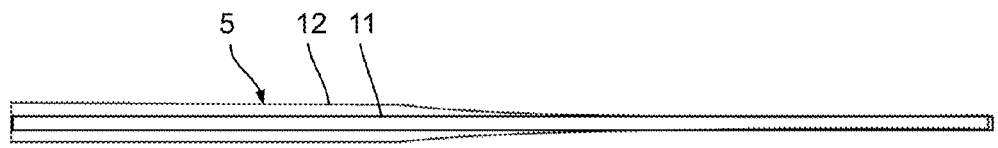
FIG. 4 an optical fibre with tapering cladding.

Such tapering optical fibres 5 are typically produced from optical fibres with a constant outer diameter, such that an increasing amount of cladding material is eroded in longitudinal direction. The cladding material is preferably eroded such that the core diameter remains constant. This can be produced for example by a chemical erosion method or alternatively by plasma or laser erosion. Such a tapered optical fibre 5 is represented in FIG. 4.

Alternatively, the optical fibre can be prepared such that a diffusion of the doping between cladding and core region is caused by heating the fibre, and thus the refractive index profile is changed such that this corresponds to an enlarged core.

Figure 5:
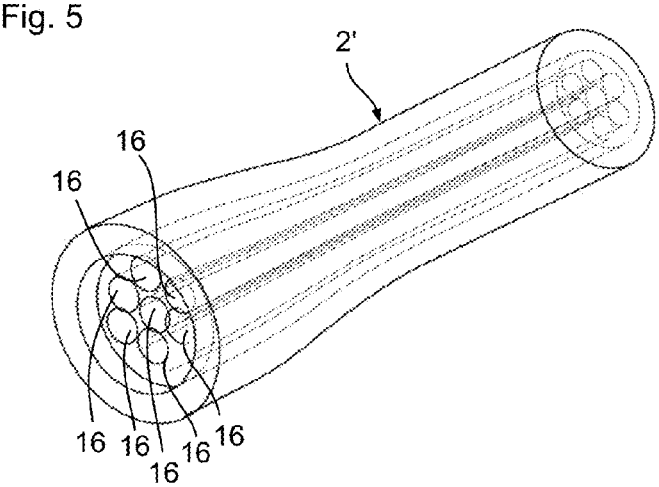
FIG. 5 a perspective representation of the tapered raw enveloping structure with the structure of an internal tube.
Figure 6:
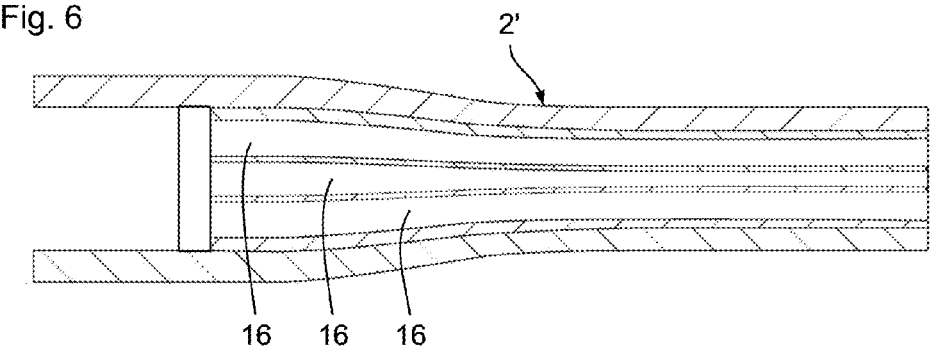
FIG. 6 a longitudinal section of the raw enveloping structure with the structure of an internal tube according to FIG. 5.

The raw enveloping structure is produced from a multi-capillary (internal tube structure) with, in this case, seven parallel bores of constant diameter, onto which the enveloping tube is fused such that the entry region 8 is formed by the projection over the multicapillary and the start of the multicapillary forms an end to the fusing because the cross-section of the bore has changed over a short distance. The raw enveloping structure is then tapered by thermal extraction, with the result that there is now a raw enveloping structure 2' shown in FIGS. 5 and 6 which now has seven tapering through bores 16 which extend from the first end 3 as far as the second end 4. The diameter of the through bores 16 is chosen such that it exceeds the minimum wall thickness between adjacent bores 16 by at least a factor of five. Furthermore, the diameter of the through bores 16 is chosen such that one tapering optical fibre 5 is inserted in one tapering through bore 16 and then, over the entire length of the through bore 16, the bore cross-section exceeds the cross-section of the optical fibre by at most a factor of two. In particular, the through bore 16 is, however, only slightly larger at the end facing the entry region 8 than the inserted tapering optical fibre 5, with the result that, after inserting the optical fibres 5, the fusing leads to as small as possible a deformation of the optical fibres 5. Preferably, at this end, there is a broadly positive lock between the tapering optical fibre 5 and the corresponding tapering through bore 16 before fusing takes place.

The fusing process is preferably carried out in longitudinal direction (axially) with as rotation-symmetrical an introduction of heat in the raw enveloping structure 2' as possible. Such a fusing process can take place in a region of the raw enveloping structure 2' to be removed later, with inserted optical fibres 5 and thus outside of the resulting fibre coupler 1, by means of a heat source which loads the fibre coupler with heat in the process via the later exit region (second end 4) as far as the entry region (first end 3). This causes the multicapillary to bring an end to fusing, with the result that the fibres in the entry region 8 are not influenced. Alternatively, in the transition 9, work can start between the unfused and fused region in the finished coupler and then the fusing can be carried out progressively in the direction of the exit region (second end 4) and out via here.

On the basis of the extensive positive lock between the optical fibres 5 and through bores 16, with lateral supply of heat by the heating source, a deformation of the optical fibres 5 can be prevented by the occurring surface tensions. In the first case this is at the end of the fusing process and with an alternative method in particular at the start of the fusing process. However, as lateral forces cannot be entirely prevented in such a transition region (between unfused and fused region), this transition 9 is particularly advantageous at a position in which a deformation in the fibre cladding 12 has an only insubstantial effect on core conduction. The transition 9 is preferably positioned such that the fibre diameter is still so large that no deformation of the fibre core occurs. For this, optical fibres 5 should be tapered to not less than 80% of the original overall diameter of the respective optical fibre 5.

The fusing is carried out (irrespective of the direction when carrying out the fusing) under tensile stress applied to the raw enveloping structure 2' and/or the fibres 5. This is optionally still supported by negative pressure in the through bores 16.

By means of the tensile stress, the additional tapering for the intended increase in the mode field diameter relative to the core diameter can be achieved already partly or entirely by drawing the coupler structure when fusing. However, it is preferred that the drawing is carried out on the final geometry in a process step following the fusing. Thus the required parameters for the output beams can be set precisely.

Figure 7:
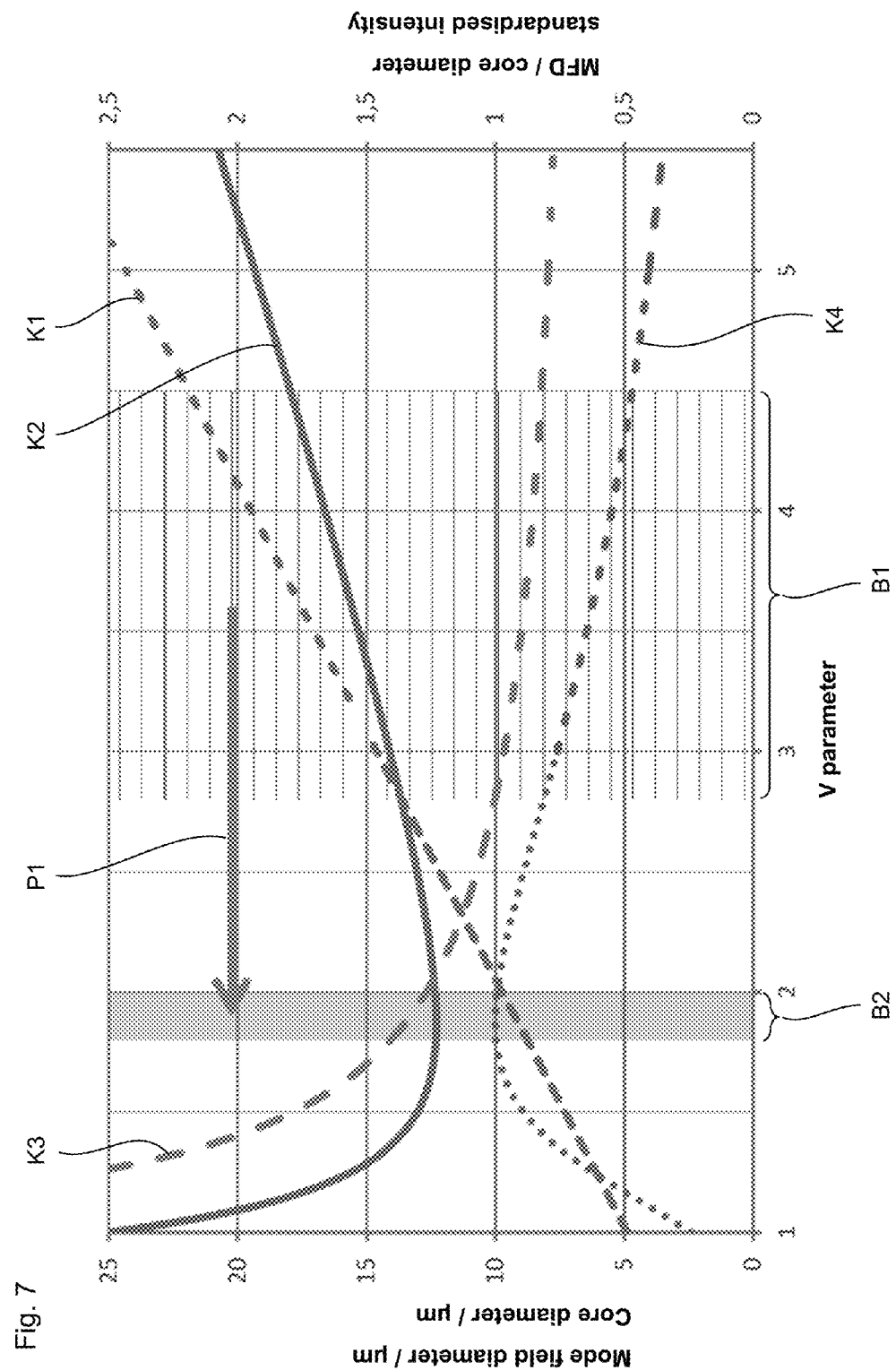
FIG. 7 a diagram in respect of the V parameter of the optical fibres of the fibre coupler according to the invention, FIG. 8 a lateral view of the fibre coupler according to the invention.

The possible V parameter values for the optical fibres 5 are to be explained below in conjunction with the diagram according to FIG. 7, in which different parameters characterising the fibre coupler 1 are represented as a function of the V parameter.

The V parameter is applied along the abscissa. Curve K1 denotes the core diameter in μm of an optical fibre 5, curve K2 shows the mode field diameter (MFD) of laser radiation conducted in the optical fibre 5, curve K3 denotes the ratio of mode field diameter to core diameter and curve K4 denotes the standardised intensity of the output beam decoupled from one of the optical fibres 5, wherein the values for the standardised intensity are indicated along the right ordinate and the values for curves K1-K3 are indicated along the left ordinate. All the values in the diagram according to FIG. 2 are indicated for a numerical aperture of the individual optical fibres 5 of 0.07 and for a wavelength of the coupled input beams of 1.07 μm.

On the input side the optical fibres 5 have a V value in the range of from 2.8 to 4.5. This range is characterised in the representation in FIG. 7 as range B1. In the design of the fibre coupler according to the invention, there is a V parameter value in the range of 1.8 to 2.0 (range B2) at the second end 4, wherein this change in the V parameter is indicated in FIG. 7 by the arrow P1.

A change in the V parameter in the range B2 changes the mode field diameter only very slightly, with the result that drawing out the fibre coupler 1 in the region of the second end 4 leads to a clear change in the distances between the optical fibres 5 and thus the output beams, without the mode field diameter (without beam diameter and divergence) being substantially changed. Thus a fine adjustment of the occupancy factor is carried out without greatly influencing the mode field diameter.

The range of from 1.8-2.0 for the V parameter at the second end 4 is preferred, as values of greater than 2.0 lead to a poorer occupancy of the phase space and values of smaller than 1.8 to an undesired deviation of the Gaussian profile as well as a poorer reproducibility.

It is self-explanatory that basic considerations for the design, according to the invention, of the coupler, can also be transferred to other optical fibres using approximate solutions explained for step index fibres.

The exit region (the second end 4) is produced by shortening the raw enveloping structure 2' fused and drawn out with the fibres by the excess length at the end of the fusing and drawing processes.

The maximum number of optical fibres 5 and their position relative to one another can be predetermined by the corresponding design of the multicapillary 6. Therefore, the fibre coupler 1 according to the invention can be designed with greater or fewer than the described seven optical fibres 5, and also deviating from the hexagonal arrangement of the optical fibres 5, e.g. square or annular in shape.

The intended overlap of the beam profiles (or the mode fields) of the input beam bundle 13 is achieved by means of the region of the complete fusing at the second end 4 of the fibre coupler 1, and this additionally offers the fibre coupler a robust and flexible interface. As there is a limited beam conduction of the individual optical fibres 5 in this region, beam conduction, improved in principle, is achieved by the fused tubular enveloping structure 2 by means of the securing of the alignment of the fibres and supporting effect.

It is also ensured that no disruption of the beam conduction induced by the internal tube structure 6 or by fusing, in particular by deforming the optical fibres 5, takes place within this region. This is achieved in particular in that the transition from non-, or only partially, fused region to completely fused region takes place in a region of good beam conduction of the individual fibres 5. This is the case in particular in the region in which the overall diameter of the fibres 5 is not yet tapered to below 80% of the original overall diameter. Thus there is a suitable adjustment of material and geometry of the optical fibres 5 and the internal tube structure 6.

Figure 8:
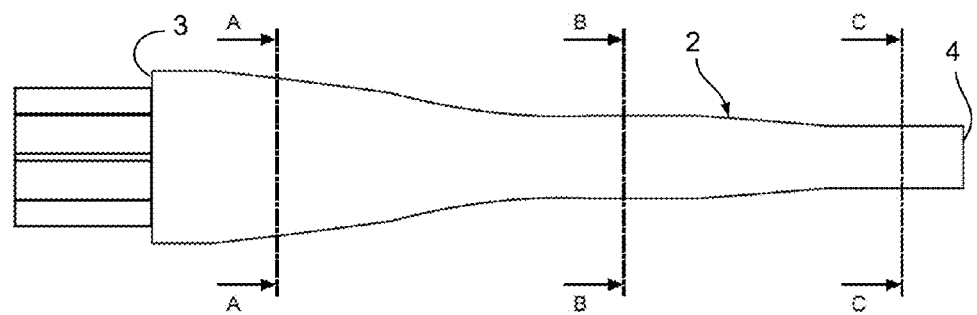
Figure 9A:
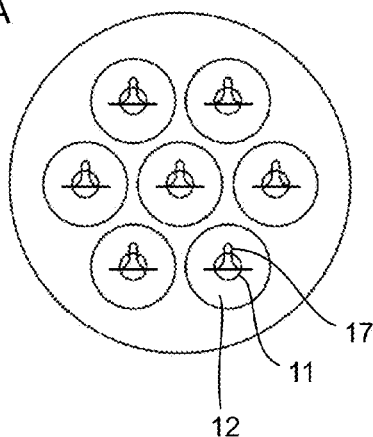
FIG. 9A a sectional view along section A-A from FIG. 8.
Figure 9B:
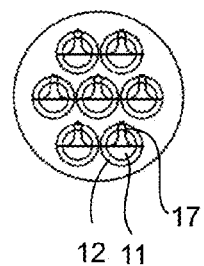
FIG. 9B a sectional view along section B-B from FIG. 8.
Figure 9C:
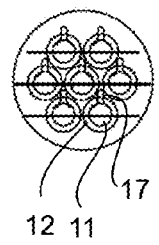
FIG. 9C a sectional view along section C-C from FIG. 8.

Furthermore, with the fibre coupler according to the invention 1, it is achieved that the input beams 13 conducted in the individual optical fibres 5 do indeed overlap in the output region (and thus at the latest at the second end 4), but the individual input beams 13 are not significantly impaired, either by the surrounding structure or by the adjacent optical fibres. This is achieved in that the mode field cross-section in the output region does indeed exceed the size of the fused, individual optical fibres 5, in which region of significant intensity, however, largely the same refractive index exists as in the cladding region of the optical fibre. For this, the material of the internal tube structure 6 is chosen such that it matches that of the fibre cladding, and a symmetrical effective refractive index profile is created outside of the cores, which ensures that the laser beam is conducted undisturbed mainly through the core, even if the mode field diameter exceeds the core diameter. In this case, the core is the region which differs from the material with an homogeneous refractive index. Thus the mode can indeed have noticeable intensity in the cladding of the adjacent optical fibre 5, but have only insignificant intensity in the core of the adjacent optical fibre 5. The cross-section geometry of the fibre core is not to be changed if possible. The extension of the modes 17 is schematically represented in the FIGS. 9A-9C, which are the sections A-A, B-B and C-C corresponding to the fibre coupler 1 shown in FIG. 8.

As an alternative to an internal tube structure 6 with a large number of round bores for accommodating the individual optical fibres 5, the optical fibres 5 can themselves be arranged such that the position of the individual fibres 5 in the coupler 1 relative to one another is defined and makes possible an extensive positive lock. In this case, the enveloping structure 2 can have an internal tube 21 with a single through bore with an adjusted cross-section, instead of the multicapillary 6.

Figure 10:
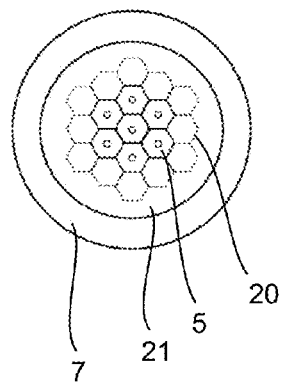
FIG. 10 a sectional view of a fibre coupler according to a further embodiment.

Thus, e.g. optical fibres 5 with tapering hexagonal outer contour can be bundled in a tapering internal tube 21 which is surrounded by enveloping tube 7, as indicated in FIG. 10. Also, the start of the internal tube 21 forms both a temperature barrier and the transition 9 to the fused region of the fibres with the enveloping structure 2 here. In the representation in FIG. 10, it is shown again with a dotted line that, in addition to the optical fibre 5 used for beam conduction, which form an internal bundle, a ring of fibres 20 surrounding this bundle is arranged in the enveloping structure 2. These additional fibres 20 can be coreless fibres or fibres with a core (for example the same as in the internal bundle). It needs merely to be ensured that there is a sufficiently thick ring of material with a homogeneous refractive index which corresponds to the cladding material of the optical fibres 5, with the result that a symmetrical effective refractive index is produced outside of the core, which ensures that the laser beam is conducted undisturbed, mainly through the core. The core region is, in this instance, the region which differs from the material with an homogeneous refractive index. The additional material provided around the internal bundle enables an undisturbed beam conduction also with a mode field diameter which exceeds the diameter of the original individual optical fibres 5. Additionally, these outer fibres 20 ensure an extensive positive lock to the internal optical fibres 5, with the result that the internal optical fibres 5 are not, or are only insubstantially, deformed upon fusing with the enveloping structure 2.

Furthermore, with the fibre coupler according to the invention 1, cavities may be permitted between the raw enveloping structure 2' and the inserted optical fibres 5 for production. In this case, optical fibres 5 are inserted in which the glass temperature of the cladding material is lower than that of the core material, with the result that, in the fusing process, the cladding material occupies the spaces and the fibre cores 11 are neither thus so deformed or so bent in cross-section that beam conduction is impaired. A tensile stress on the optical fibres 5 ensures that the fibre cores 11 do not suffer any fibre bending (in particular in the transition region in which, in this variant, the lower ratio of core to overall cross-section represents an increased risk of bending upon deformation of the cladding).

A light-conducting structure, preferably an optical fibre, can be coupled directly to the fibre coupler 1, and thus to the second end 4. As the exit surface of the second end 4 is completely fused and can thus be prepared flexibly, the light-conducting structure can be directly coupled to same. The optical fibre of the light-conducting structure can be a multimode fibre which is designed such that the whole output beam bundle 14 transmits in the cores of the multimode fibre, wherein the multimode fibre is preferably designed such that the brilliance of the output beam bundle 14 is broadly retained during conduction in the multimode fibre. This can also be a dual-core fibre, in particular one with a fundamental mode core embedded in a multimode core, with the result that central beams of the output beam bundle 14 are coupled in the internal core and the remaining beams in the surrounding core. Instead of a dual core, the use of a central core with rings surrounding same is appropriate which, in each case, can be coupled in one or more beams. Beam conduction can then take place separately in the core and the rings. Basically, a suitable multicore fibre can also be attached, with the result that, for example, each optical fibre 5 is assigned a core in the multicore fibre.

Alternatively, the output beam bundle 14 can be coupled via a free beam path in a light-conducting structure, in particular a fibre. The free beam path can optionally have one or more imaging elements. Furthermore, it is possible that an imaging element is coupled directly to the second end 4 of the fibre coupler 1.

The fibre coupler according to the invention 1 ensures that the beam axes remain aligned and the output beams have an angular tolerance which is smaller than its divergence angle, with the result that the output beams can still be addressed individually at the output or at the end 4.

The fibre coupler according to the invention 1 also ensures that the output beams also continue to propagate well outside of the coupler 1, thus they do not degrade.

In an alternative embodiment, the fibre coupler 1 can be provided with a so-called end-cap at the second end 4. This is made e.g. from a quartz glass or piece of fibre without a core and ensures that the output beams diverge. This leads to a decrease in intensity of the laser radiation and to an increase in the damage threshold of the fibre barrier layer, with the result that an anti-reflection layer or filter layer can be applied to the exit surface of the end-cap.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A fibre coupler, comprising:
a tubular enveloping structure; and
a plurality of optical fibres arranged in the enveloping structure, each of which includes
a fibre core and a fibre cladding surrounding same, in order to conduct laser radiation, and each of which extends from a first end as far as a second end of the enveloping structure,
wherein the enveloping structure has a tapering section which is tapered in a first direction from the first as far as the second end,
wherein, in the tapering section, both a first ratio of the diameter of the fibre core to the diameter of the fibre cladding and a second ratio of the diameter of the mode field of the laser radiation conducted in the optical fibre to the diameter of the fibre core increase in the first direction for each optical fibre, and
wherein the thickness of the fibre cladding decreases in the first direction in order to increase the first ratio.

2. The fibre coupler according to claim 1, wherein the optical fibres are completely fused with one another at the second end, at least one of directly and via the enveloping structure.

3. The fibre coupler according to claim 2, wherein the transition from the unfused region to the completely fused region lies at a point in the fibre coupler at which the optical fibres are tapered to at most 80% of their original overall diameter.

4. The fibre coupler according to claim 1, wherein the optical fibres are completely fused with one another in the tapering section, at least one of directly and via the enveloping structure.

5. The fibre coupler according to claim 4, wherein the transition from the unfused region to the completely fused region lies at a point in the fibre coupler at which the optical fibres are tapered to at most 80% of their original overall diameter.

6. The fibre coupler according to claim 1, wherein the maximum value of the second ratio is chosen such that there is an individual beam conduction in each optical fibre in spite of an overlapping of the modes in adjacent optical fibres.

7. The fibre coupler according to claim 1, wherein at the second end there is a homogeneous refractive index between the cores of the optical fibres, the homogeneous refractive index corresponding to the refractive index of the cladding material.

8. The fibre coupler according to claim 1, wherein at the second end and about each core of the optical fibres along a cross-section surface which corresponds to the distance to the next adjacent core there is an homogeneous refractive index corresponding to the cladding material of the optical fibre.

9. The fibre coupler according to claim 1, wherein the diameter of the fibre core decreases in the first direction in order to increase the second ratio.

10. The fibre coupler according to claim 1, wherein the optical fibres are either fundamental mode or low mode optical fibres.

11. The fibre coupler according to claim 1, wherein the enveloping structure includes a multicapillary, which has precisely one through bore for each optical fibre.

12. A method for producing a fibre coupler, the method comprising:
providing several optical fibres, each of which include a fibre core and a fibre cladding surrounding the fibre core, the cladding having a thickness;
inserting the several optical fibres in a tubular raw enveloping structure such that they lie adjacent to one another;
fusing the optical fibres with one another at least one of directly and via the raw enveloping structure, wherein the raw enveloping structure is tapered with the inserted optical fibres in a tapering section in a first direction with the result that, in the tapering section, both a first ratio of the diameter of the fibre core to the diameter of the fibre cladding and also a second ratio of the diameter of the mode field of the laser radiation to be conducted in the optical fibre to the diameter of the fibre core increases in the first direction increases for each optical fibre; and
decreasing the thickness of the fibre cladding in the first direction in order to increase the first ratio.

13. The method according to claim 12, wherein the raw enveloping structure includes an internal tube structure with bores for each optical fibre, the method further comprising inserting at least one of the optical fibres in each of the bores.

14. Method according to claim 13, in which the bores are formed tapered before the optical fibres are inserted.

15. The method according to claim 12, wherein the raw enveloping structure includes a tube with a bore in which the optical fibres are inserted and then lie directly adjacent to one another.

16. The method according to claim 15, wherein the bore(s) are formed tapered before the optical fibres are inserted.

17. The method according to claim 12, wherein the optical fibres are charged with tensile stress when being fused.

18. The method according to claim 12, wherein a transition from fully unfused optical fibres to optical fibres, which are at least one of fully fused with one another and fused via the raw enveloping structure, is formed in axial direction.

19. The method according to claim 12, wherein a second ratio of the diameter of the mode field of the laser radiation to be conducted in the optical fibre to the diameter of the fibre core is increased by drawing the fused optical fibres.

* * * * *